(12) United States Patent
Goering et al.

(10) Patent No.: US 6,899,941 B2
(45) Date of Patent: May 31, 2005

(54) REINFORCED ARTICLE AND METHOD OF MAKING

(75) Inventors: Jonathan Goering, York, ME (US); James Crawford, Rye, NH (US); Bruce Bond, Rochester, NH (US)

(73) Assignee: Albany International Techniweave, Inc., Rochester, NH (US)

( * ) Notice: Subject to any disclaimer, the term of this patent is extended or adjusted under 35 U.S.C. 154(b) by 0 days.

(21) Appl. No.: 09/796,942

(22) Filed: Mar. 1, 2001

(65) Prior Publication Data

US 2002/0081926 A1 Jun. 27, 2002

Related U.S. Application Data

(63) Continuation-in-part of application No. 09/749,318, filed on Dec. 27, 2000, now Pat. No. 6,733,862.

(51) Int. Cl.⁷ .............................................. D03D 25/00
(52) U.S. Cl. .................. 428/121; 428/123; 428/130; 428/175; 442/181; 442/203; 442/218; 264/103; 493/405
(58) Field of Search ................................ 428/121, 123, 428/130, 175; 442/181, 203, 218; 264/103; 493/405

(56) References Cited

U.S. PATENT DOCUMENTS

| 3,623,924 A | 11/1971 | Winter et al. |
| 4,725,485 A | 2/1988 | Hirokawa |
| 4,906,506 A | 3/1990 | Nishimura et al. |
| 4,922,968 A | 5/1990 | Bottger et al. |
| 5,064,705 A | 11/1991 | Donovan, Sr. |
| 5,100,713 A | 3/1992 | Homma et al. |
| 5,521,000 A | * 5/1996 | Owens ....................... 442/218 |
| 5,817,409 A | * 10/1998 | Stephan et al. ............. 428/116 |
| 6,412,325 B1 | 7/2002 | Croswell |

FOREIGN PATENT DOCUMENTS

| DE | 88 02 711.2 | 3/1988 | |
| DE | 197 16 637 A1 | 4/1997 | |
| EP | 426158 A1 * | 5/1991 | ............. B32B/5/28 |
| EP | 0 683 035 A1 | 11/1995 | |
| GB | 1 205 275 | 3/1968 | |

* cited by examiner

Primary Examiner—Elizabeth M. Cole
(74) Attorney, Agent, or Firm—Frommer Lawrence & Haug LLP; Ronald R. Santucci

(57) ABSTRACT

A fabric for providing reinforcement and the like which is made from a two dimensional flat fabric which includes portions that the warp and weft fibers are interlocked together and portions that are non-interlocked together that allow the fabric to be folded to create a three dimensional structure without the need for cutting and darting.

26 Claims, 5 Drawing Sheets

REINFORCED ARTICLE AND METHOD OF MAKING

CROSS REFERENCE TO RELATED APPLICATIONS

This application is a continuation-in-part of U.S. Ser. No. 09/749,318, filed Dec. 27, 2000 now U.S. Pat. No. 6,733,862 entitled "Reinforced Article and Method of Making" the disclosure of which is incorporated herein by reference.

FIELD OF THE INVENTION

The present invention relates to a textile reinforced substrate which is formed into a three dimensional article by thermoforming or other means suitable for the purpose.

BACKGROUND OF THE INVENTION

Fiber reinforced composite structures enjoy the benefit of being lightweight while providing mechanical advantages such as strength. However, in many applications, molded plastic, wood or metal structures are preferred due to the cost involved, since they are relatively easy to fabricate. Often times however, articles, such as package or storing crates, are prone to damage due to the rough handling involved or are limited in their stacking ability due to weight and strength considerations. While fiber reinforced composite structures would be more desirable, the expense involved in making a somewhat complex three dimensional (3D) structure is a consideration.

This is because composite structures start off typically with a woven flat substrate of fibers. The substrate then has to be shaped into the form of the article which is then coated with a resin and thermoformed or cured in the desired shape. This may be readily done for relatively flat or smooth surfaces. However, for angled surfaces such as at the junction of the sides, corners and bottoms of a box or crate, cutting or darting is required. This is somewhat labor intensive and adds to the cost of manufacture. For things typically considered to be inexpensive, for example a packaging crate, the added expense may outweigh the benefits of it being reinforced.

While woven 3D structures may be woven by specialized machines, the expense involved is considerable and rarely is it desirable to have a weaving machine dedicated to creating a simple structure.

Accordingly, while fiber reinforced articles are desirable in many applications to replace comparable plastic, wood or metal structures, there exists a need to reduce the cost involved in the method of their manufacture. By doing so it may also allow for their relative mass production and wide spread application.

SUMMARY OF THE INVENTION

It is therefore a principal object of the invention to minimize or eliminate the need to cut and dart reinforcing fabrics for 3D structures.

It is a further object as part of this to simplify the manufacture of such structures and reduce the labor requirement.

A yet further object of the invention is to avoid the need for special weaving equipment to create 3D structures.

A still further object is to provide for a method of creating a reinforcing fabric which may be readily adapted to create a wide variety of different 3D structures.

These and other objects and advantages will be apparent from the present invention. The present invention is directed toward providing a specially designed fabric suitable as the reinforcement for a 3D composite structure. The fiber reinforcement is one that may be woven on conventional weaving machinery. It starts off as a woven 2D structure that is then formed into a 3D structure, particularly one having deep draws. To provide for this, the reinforcing fabric is woven in a manner that, in portions of the weave, the warp and weft or fill fibers are laid on each other and do not interlock. In this portion the fibers can move independently and slide past one another when the fabric is drawn or folded into shape. If the portion is a rectangular or square shape, it can be collapsed in such a manner that both the warp and weft fibers fold upon themselves and each other to align in an unidirectional manner which creates a corner which acts as a compression column in the final structure.

Another way of creating the reinforcing textile is by way of stitch bonded fabrics. These are fabrics made through a combination of high-speed fiber laying/fiber placement technology and knitting technology. In stitch bonded fabrics, the fibers or yarns in the warp and weft direction are not interlaced. Knitting needles interlock each intersection of warp and weft fibers with a third stitching yarn. The stitching yarns also binds a wale of adjacent stitching yarns. In the present invention, selected regions of the warp and weft yarns are not bound by stitching yarns creating areas similar to the "non-woven" areas in the aforesaid embodiment. Accordingly, in these areas, the fibers can move independently and slide past each other when the fabric is drawn or folded into shape.

A yet further manner of creating the reinforcing textile is to have two layers of fibers laid at 90 degrees (or other angles) with respect to each other and then, in selected areas, bonded together at the warp and weft intersections. This would require that at least one of the two directions of fibers be comprised of fibers that are thermoplastic or have a thermoplastic coating or component. Those areas that are bonded would act as "woven". Those which are not bonded would act as "non-woven" areas similar to the earlier embodiment.

BRIEF DESCRIPTION OF THE DRAWINGS

Thus by the present invention its objects and advantages will be realized the description of which should be taken and in conjunction with the drawings wherein.

DETAILED DESCRIPTION OF THE PREFERRED EMBODIMENT

Figure 1:
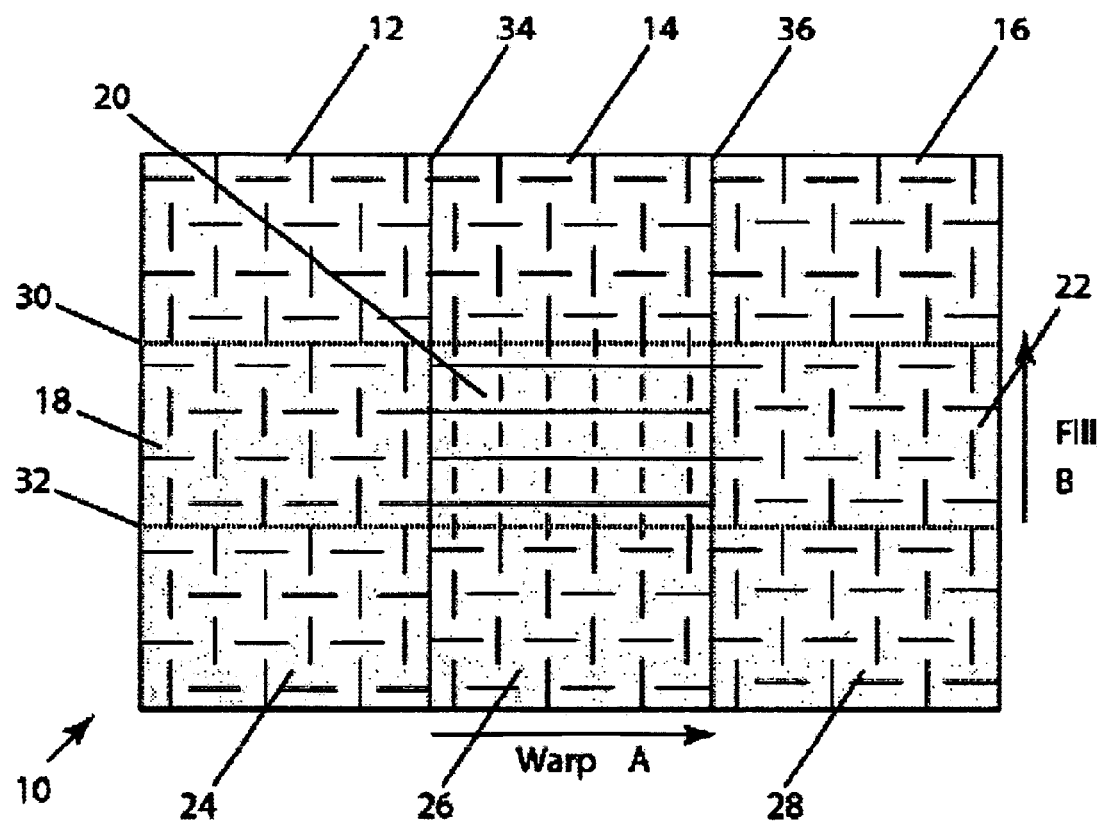
FIG. 1 illustrates the construction of a flat 2D woven fabric incorporating the teachings of the present invention.

Turning now more particularly to the drawings, like parts will be similarly numbered. In FIG. 1, there is shown a flat 2D woven reinforcement fabric 10 which illustrates the present invention. The fabric 10 may be woven using any conventional textile pattern such as plain, satin, twill, etc. or any other pattern suitable for this purpose. The fiber used can be any fiber that can be woven, synthetic or natural, including for example fibers made from glass, Kevlar®, carbon, nylon, rayon, polyester, cotton, etc. and may be woven on conventional weaving equipment.

In FIG. 1, the warp fibers are shown in direction A with the weft fibers in direction B. For purposes of this illustration the fabric 10 has been divided into regions 12 through 28 divided along fold lines 30–36. In regions 12–18 and 22–28 the fibers are woven in a conventional fashion with the warp fibers intersecting with the weft fibers. In region 20 these fibers do not interlock, in other words the weft fibers float beneath the warp fibers. In region 20 the fibers can therefore move independent of one another.

Once the fabric 10 is constructed, it can then be formed into the desired shape. If it is to act as a reinforcing structure, the fabric can be impregnated with the desired material or resin and then formed or thermoformed into shape. Alternatively, co-mingled tows consisting of a structural fiber and a thermoplastic resin could be woven to produce a preform which is then thermoformed.

Figure 2:
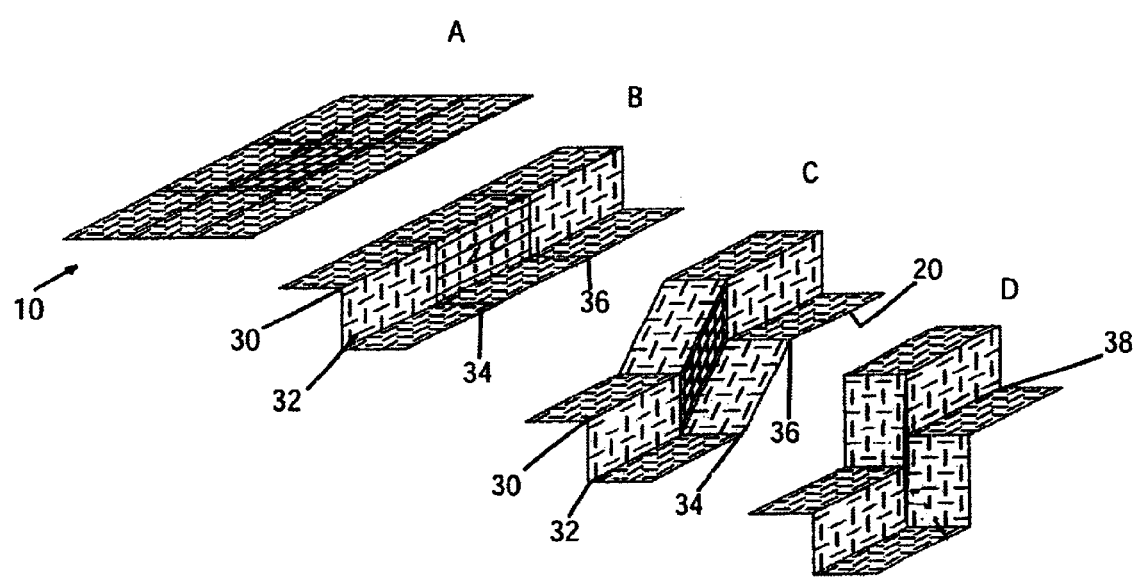
FIGS. 2A–2D illustrates the sequence of folding or drawing down the fabric to produce deep draws.

Turning now to FIG. 2A–2D, shown in FIG. 2A is the flat 2D woven fabric 10. The fabric 10 is then folded along fold lines 30 and 32 which are parallel to the warp fibers, as shown in FIG. 2B. The fabric 10 is then folded along fold lines 34 and 36 which are parallel to the weft fibers and perpendicular to the warp fibers, as shown in FIG. 2C. In this process since the warp and weft fiber in region 20 are not interlocked, they slide past one another and ultimately accumulate in corner 38 as shown in FIG. 2D. The fibers in corner 38 are now unidirectional and can act as a compression column and increase the strength of the structure being formed. The foregoing can be done automatically by thermoforming equipment having the desired shaped mold, or by other means suitable for this purpose; then the structure heat set or cured.

The foregoing advantageously avoids the need for cutting or darting, thereby reducing the amount of labor required and the ultimate cost of the article. The present invention allows for the increased automation of the fabrication and therefore broadens the applications for which reinforced structures may be used.

Figure 3:
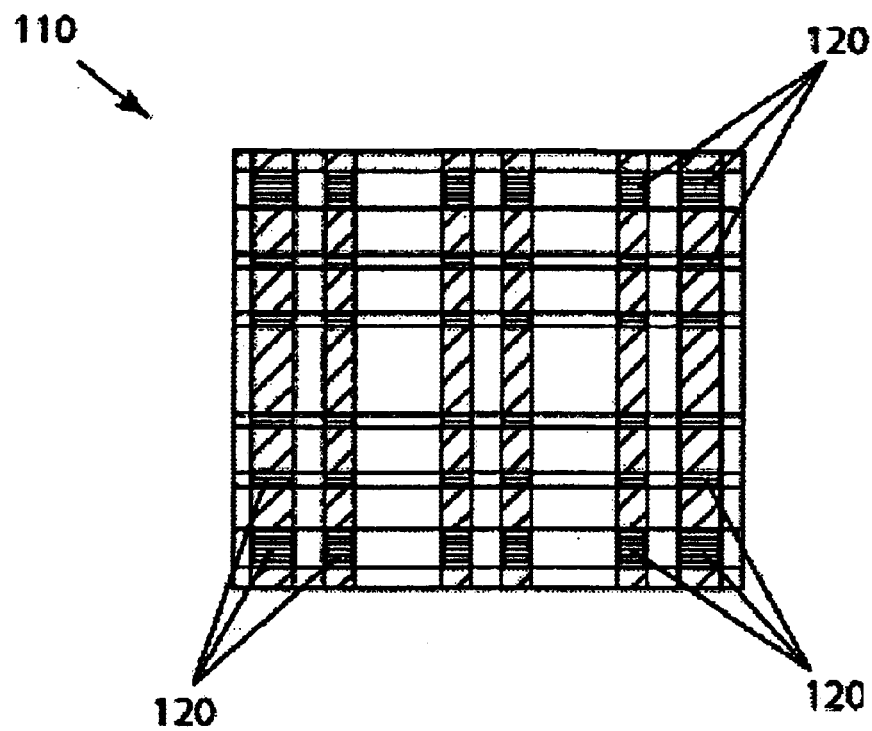
FIG. 3 illustrates a 2D fabric having multiple areas where warp and weft fibers are not interwoven to create a complex structure upon folding or drawing down.
Figure 4:
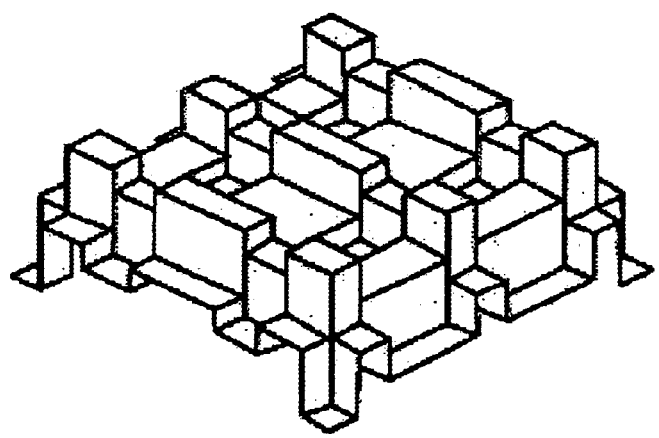
FIG. 4 is a perspective view of a 3D structure formed from the fabric shown in FIG. 3.

Turning now briefly to FIG. 3 there is shown a flat woven 2D fabric 110. Fabric 110 illustrates a plurality of regions 120 wherein in the woven structure, the warp fibers merely lay on the weft fibers. With such a fabric 110, it may be folded and shaped into a complex reinforced structure 130 as shown in FIG. 4. Of course other shapes can be created by varying the size and location of the regions where the warp and weft fibers do not interlock.

Figure 5:
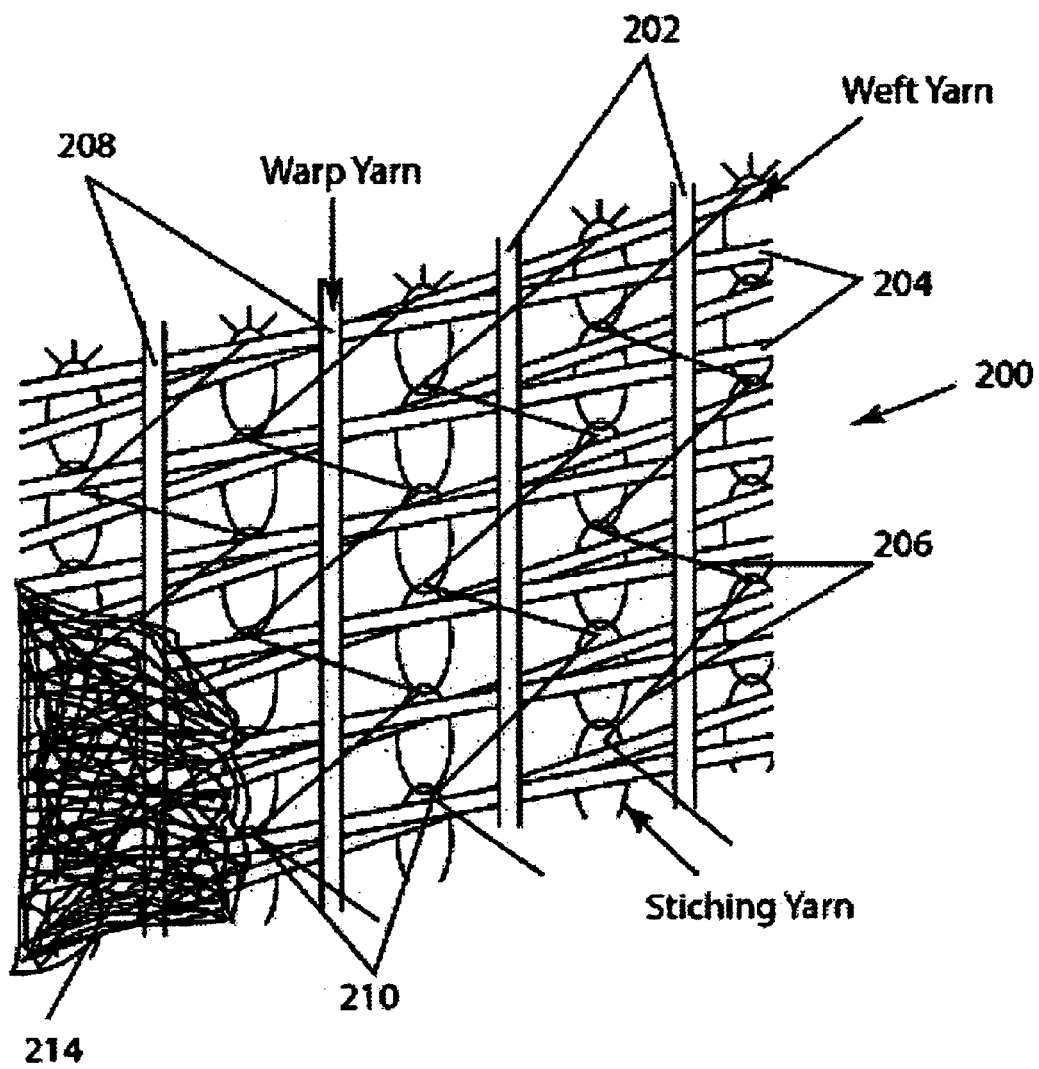
FIG. 5 is a perspective view of a stitch bonded fabric, incorporating the teachings of the present invention.
Figure 6:
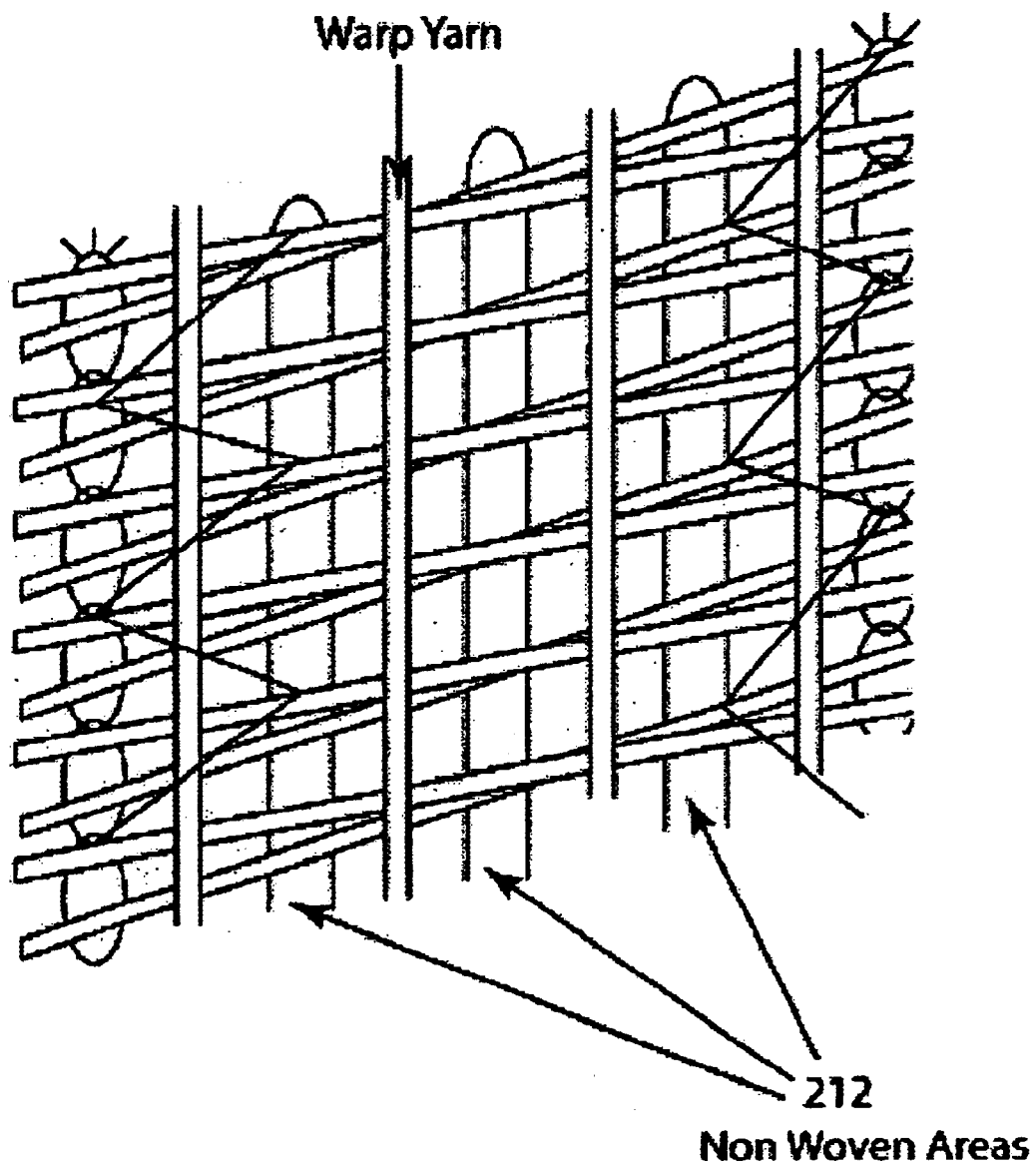
FIG. 6 is a perspective view of a stitch bonded fabric having select areas not bound by stitching yarn, incorporating the teachings of the present invention.

In another embodiment, there are alternate fabric forming machines to that of conventional weaving looms that have been designed over the years, some of which rely on a combination of high-speed fiber laying/fiber placement technologies and knitting technology. As aforesaid, the fabrics made on such machines are often referred to as "stitch bonded fabrics" or "knitting through" technology. The fibers or yarns in the warp and weft directions of such fabrics do not interlace. They are instead laid down in layers. For example, the warp yarns of fibers would be on one face of the fabric and the weft yarns on the other face of the fabric. As shown in FIG. 5 in the stitch-bonded fabric 200 shown, knitting needles would interlock each intersection of warp 202 and weft 204 yarns with a third stitching yarn 206. The stitching yarns 206 serve two purposes. First, they bind warp 202 and weft 204 yarns at each intersection 208. Secondly, the stitching yarns 206 also bind a wale 210 of stitching yarns 206 with the adjacent wale 210 of stitching yarns 206. Without this interconnection, a fabric would not be formed. The "standard" stitch bonded fabric design, such as that produced by Malimo® technology which is available from Meyer Textile Machine Corporation located in Obertshausen, Germany, results in all yarn intersections being bound by stitching yarns 206. However, the fabric 200 provided by the present invention as shown in FIG. 6 has selected regions 214 of the fabric 200 that do not have warp and weft yarns bound by stitching yarns 206. This is accomplished by a redesign of the stitching yarn mechanisms so that the regions where binding is desired and where binding is not desired can be independently controlled so as to create "woven" and "non-woven" areas as previously described which would operate in a similar fashion. It might be noted that the interconnecting of adjacent wales by stitching yarns may not be required in every design due to the existence of weft yarns to stabilize the fabric in that direction.

In addition, it may be desirable with a stitch bonded fabric to incorporate fibrous mats or veils 214 with the warp, weft and stitching yarns. These mats can be applied to the surface, for example, to enhance a desirable feature such as a smoother surface finish. The fibrous mats may be introduced in such a manner that the knitting needles penetrate the mat and thereby bind it to the fabric by the stitching yarns.

A yet further way to create a reinforcing textile which would perform in a similar manner to that first described is as follows. This would involve two layers of parallel yarns or fiber laid at 90 degrees (or another angle, if suitable for the purpose) and then bonded to each other in selected areas to fix the fiber locations at warp and weft intersections. The process provides for that at least one of the two directions of fiber be comprised of fibers that are thermoplastic, have a thermoplastic coating or have a thermoplastic component (for example comingled fibers). In this regard, the thermoplastic coating (or component) would be heated to a point where the polymer (thermoplastic material) would melt, adhere to the fiber in contact with it and then be cooled to provide a semi-permanent bond. Other areas would not be bonded. The areas with no bonding would be free to move in a similar fashion to the "non-woven" areas as first discussed. Bonding could be accomplished by an electrically heated contact point, by laser, by ultrasonics or other means suitable for purpose. By this method the speed of fabrication of the reinforcing textile is enhanced.

Thus by the present invention its objects and advantages are realized and although preferred embodiments have been disclosed and described in detail herein, its scope should not be limited thereby rather its scope should be determined by that of the appended claims.

What is claimed is:

1. A fabric for forming a structure having a three dimensional shape, said fabric comprising:

warp and weft fibers;

warp and weft fibers in a first portion of the fabric which are interlocked together;

a plurality of adjacent warp fibers and a plurality of adjacent weft fibers in a second portion of the fabric wherein the warp and weft fibers are not interlocked together and are allowed to move independent of one another; and whereas a folding of the fabric in a first direction parallel to the warp fibers and a second direction parallel to the weft fibers causes the second portion to collapse by causing the warp and weft fibers in the second portion to come into alignment with each other so as to be parallel with each other.

2. The fabric according to claim 1 wherein the second portion is surrounded by the first portion.

3. The fabric according to claim 1, which includes a plurality of first portions and second portions.

4. The fabric according to claim 3, wherein the second portions are surrounded by first portions.

5. The fabric according to claim 1, wherein in the first portion warp and weft fibers are interlocked together by stitch bonding.

6. The fabric according to claim 5, wherein in the second portion, stitch bonding is absent.

7. The fabric according to claim 5 which further includes a fibrous mat as part of the fabric.

8. The fabric according to claim 1, wherein a plurality of warp or weft fibers comprise thermoplastic material, thermoplastic coating or component and in said first portion warp and weft fibers are interlocked together by bonding.

9. The fabric according to claim 8, wherein in the second portion warp and weft fibers are not bonded together.

10. The fabric according to claim 8, wherein bonding is caused by heat, laser or ultrasonics.

11. The fabric according to claim 1, wherein said warp and weft fibers are laid down in non-interlacing layers.

12. The fabric according to claim 5, wherein said warp and weft fibers are laid down in non-interlacing layers.

13. The fabric according to claim 8, wherein said warp and weft fibers are laid down in non-interlacing layers.

14. The fabric according to claim 1, wherein the folding takes place at a junction formed between the first portion and the second portion.

15. A method of making a fabric for forming a structure having a three dimensional shape comprising the steps of:
    forming fabric comprising warp and weft fibers to create a first portion of the fabric where warp and weft fibers interlock;
    forming a second portion of the fabric where a plurality of warp fibers and a plurality of weft fibers do not interlock an dare allowed to move independent of each other; and folding said fabric in such a manner so as to collapse the second portion by causing warp and weft fibers in the second portion to come into alignment with each other so as to be parallel with each other.

16. The method according to claim 15 which includes the step of forming the fabric with the second portion surrounded by the first portion.

17. The method according to claim 15, which includes the step of forming the fabric with a plurality of first portions and second portions.

18. The method according to claim 17, which includes the step of forming the fabric with the second portions surrounded by first portions.

19. The method in accordance with claim 15, wherein the folding of the fabric occurs in a first direction parallel to the warp fibers and a second direction parallel to the weft fibers causes the second portion to collapse by causing the warp and weft fibers in the second portion to come into alignment with each other.

20. The method in accordance with claim 19, wherein the folding takes place at a junction formed between the first portion and the second portion.

21. The method in accordance with claim 15, which includes the step of interlocking the warp and weft fibers in the first portion by stitch bonding.

22. The method according to claim 15, wherein a plurality of warp or weft fibers comprise thermoplastic material, thermoplastic coating or component and in said first portion warp and weft fibers are interlocked together by bonding.

23. The method according to claim 22, wherein bonding is caused by heat, laser or ultrasonics.

24. The method in accordance with claim 15, wherein said fabric is contained in a three dimensional structure which is thermoformed into shape.

25. The method in accordance with claim 21, wherein said fabric is contained in a three dimensional structure which is thermoformed into shape.

26. The method in accordance with claim 22, wherein said fabric is contained in a three dimensional structure which is thermoformed into shape.

* * * * *